US010683996B1

(12) United States Patent
Isayama

(10) Patent No.: US 10,683,996 B1
(45) Date of Patent: Jun. 16, 2020

(54) ILLUMINATION SYSTEM AND ILLUMINATION METHOD

(71) Applicant: ISA CO., LTD., Yokohama-shi, Kanagawa (JP)

(72) Inventor: Kiyoshi Isayama, Tokyo (JP)

(73) Assignee: ISA CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 16/610,019

(22) PCT Filed: Aug. 1, 2019

(86) PCT No.: PCT/JP2019/030366
§ 371 (c)(1),
(2) Date: Oct. 31, 2019

(30) Foreign Application Priority Data

May 28, 2019 (JP) ................................ 2019-099416

(51) Int. Cl.
| F21V 21/16 | (2006.01) |
| H02G 11/02 | (2006.01) |
| F21V 23/00 | (2015.01) |
| F21S 8/06 | (2006.01) |
| F21S 9/02 | (2006.01) |

(Continued)

(52) U.S. Cl.
CPC .............. *F21V 21/16* (2013.01); *F21S 8/061* (2013.01); *F21S 9/02* (2013.01); *F21V 23/001* (2013.01); *F21V 23/003* (2013.01); *F21V 23/02* (2013.01); *H02G 11/02* (2013.01); *F21W 2131/406* (2013.01)

(58) Field of Classification Search
CPC ...... F21V 21/16; F21V 23/001; F21V 23/003; F21V 23/02; F21S 8/061; F21S 9/02

USPC .......................................................... 362/190
See application file for complete search history.

(56) References Cited

U.S. PATENT DOCUMENTS

| 5,992,787 A * | 11/1999 | Burke ................. H02G 11/02 206/409 |
| 10,093,522 B1 * | 10/2018 | Baugh ...................... B66D 1/36 |

(Continued)

FOREIGN PATENT DOCUMENTS

| JP | 2007-287500 A | 11/2007 |
| JP | 2008-257961 A | 10/2008 |

(Continued)

OTHER PUBLICATIONS

Sep. 24, 2019 Written Opinion of the International Searching Authority issued in International Patent Application No. PCT/JP2019/030366.

*Primary Examiner* — Bryon T Gyllstrom
(74) *Attorney, Agent, or Firm* — Oliff PLC

(57) ABSTRACT

An illumination system is provided that supplies sufficient electric power to a light-emitting element. The illumination system includes: an elevation device that has a reel wire extending downwardly and that changes a length of the reel wire; and an illumination device that is connected to the reel wire and that is elevated by a change of the length of the reel wire. Electric power is supplied from a power supply through the reel wire to the illumination device. The illumination device includes: a battery for receiving the electric power supplied through the reel wire to store the electric power; and a light-emitting element for receiving the electric power supplied through the reel wire and the electric power supplied from the battery to emit light.

7 Claims, 10 Drawing Sheets

(51) Int. Cl.
*F21V 23/02* (2006.01)
*F21W 131/406* (2006.01)

(56) References Cited

U.S. PATENT DOCUMENTS

| | | | | |
|---|---|---|---|---|
| 2005/0087644 | A1* | 4/2005 | Kim | B65H 75/425 |
| | | | | 242/390.8 |
| 2008/0217460 | A1* | 9/2008 | Shin | B66D 3/08 |
| | | | | 242/390.1 |
| 2008/0247179 | A1* | 10/2008 | Isayama | F21S 2/00 |
| | | | | 362/386 |
| 2009/0211860 | A1* | 8/2009 | Glenn | B65H 75/406 |
| | | | | 191/12.2 R |
| 2011/0193037 | A1* | 8/2011 | Smith | B66D 3/18 |
| | | | | 254/336 |
| 2014/0145129 | A1* | 5/2014 | Bauder | B66D 1/46 |
| | | | | 254/275 |
| 2014/0262665 | A1* | 9/2014 | Giles | H02G 11/02 |
| | | | | 191/12.4 |
| 2017/0047045 | A1* | 2/2017 | Isayama | G09G 5/10 |
| 2017/0097128 | A1* | 4/2017 | Stafford | B65H 75/4468 |
| 2019/0078765 | A1* | 3/2019 | Isayama | F21S 8/061 |
| 2020/0049335 | A1* | 2/2020 | Isayama | F21V 21/38 |

FOREIGN PATENT DOCUMENTS

| | | |
|---|---|---|
| JP | 2017035304 A | 2/2017 |
| JP | 2017-195119 A | 10/2017 |
| WO | 2019/009418 A1 | 1/2019 |

* cited by examiner

| CHARGE MODE | REPRESENTATION MODE | CHARGING BATTERY | SUPPLYING ELECTRIC POWER TO LIGHT-EMITTING ELEMENT |
| --- | --- | --- | --- |
| ON | ON | × | ○ |
| ON | OFF | ○ | × |
| OFF | ON | × | ○ |
| OFF | OFF | × | × |

FIG.8

ILLUMINATION SYSTEM AND ILLUMINATION METHOD

TECHNICAL FIELD

The present disclosure relates to an illumination system and an illumination method. In particular, the present disclosure relates to an illumination system and an illumination method for supplying electric power to a light-emitting element emitting light in a stage representation.

BACKGROUND ART

A representation method using a plurality of illumination devices has been known in a stage representation for supporting a representation performed by a performer in a theatrical play, music, and dance for example (Patent Literature 1). According to the technique disclosed in Patent Literature 1, a three-dimensional representation is provided by each of a plurality of elevation devices elevating an illumination device connected thereto via a reel wire to control the light emission from the illumination device. The plurality of elevation devices are suspended from a planar baton (FIG. 7).

In the above-described stage representation, a representation method has been known in which each display panel is suspended from each of a plurality of elevation devices via a suspension wire to elevate the display panel (Patent Literature 2). According to the technique disclosed in Patent Literature 2, a plurality of bars constituting a display panel have a plurality of light-emitting elements (LED), respectively (FIG. 2). Specifically, according to the technique disclosed in Patent Literature 2, a to-be-lifted object suspended from an elevation device has a plurality of light-emitting elements. The elevation device and a bar are connected via a suspension wire that includes an electric power cable and a control cable. The electric power cable supplies electric power from a power source to a light-emitting element. The control cable supplies a control signal to the light-emitting element. Each light-emitting element emits light by the electric power supplied from the electric power cable and modulates the light based on a control signal and generates light (FIG. 4 and FIG. 5).

Furthermore, in the above-described stage representation, an illumination elevation device has been known in which a reel is provided and the reel is rotated to wind and unwind a reel wire around the reel to elevate a light-emitting element attached to the reel wire (Patent Literature 3). According to the technique disclosed in Patent Literature 3, the reel is provided such that its longitudinal direction is in a vertical state and rotated around the axis of a plane in a short direction, and the reel wire is wound around the reel upwardly.

CITATION LIST

Patent Literature

[Patent Literature 1] Japanese Patent Laid-Open No. 2008-257961
[Patent Literature 2] Japanese Patent Laid-Open No. 2017-035304
[Patent Literature 3] Japanese Patent Laid-Open No. 2017-195119

SUMMARY OF INVENTION

In the above-described stage representation, a plurality of illumination devices are often used in order to provide a more gorgeous stage representation (that is, when the techniques disclosed in Patent Literatures 1 to 3 are used, a plurality of elevation devices are suspended from a ceiling). Under such background, many elevation devices suspended from the ceiling cause a huge load to the ceiling. Increasing the weight of an elevation device causes to increase the risk where the elevation device falls during the stage representation. Furthermore, since the stage representation is visually viewed from a viewer, the large size of the elevation device may not preferred for the representation. Thus, an elevation device is desired to have less weight and simpler and smaller structure.

The illumination elevation device disclosed in Patent Literature 3 has a structure in which a reel wire is wound around a reel wire reeling face in the longitudinal direction of the reel. Thus, increasing the diameter of the reel wire causes to increase the length of the reel wire reeling face. Increasing the length of the reel wire reeling face causes the entire illumination elevation device to have a larger size. Thus, in order to provide an elevation device having less weight and smaller size, the reel wire must have a smaller diameter. The reel wire extends downwardly together with the illumination device and thus can be visually recognized for a viewer. From the viewpoint of a stage representation, the reel wire preferably has a small diameter.

In the representation method disclosed in Patent Literature 2, a suspension wire used to suspend a display panel including a light-emitting element functions as an electric power cable for supplying electric power to the light-emitting element. Thus, if the suspension wire has the small diameter, the light-emitting element may receive an insufficient amount of electric power. This is because that the suspension wire having the small diameter causes the electric power cable provided in the suspension wire to have a small diameter.

In the representation method disclosed in Patent Literature 1, a charge unit of the elevation device is used to charge a battery of the illumination device. The reel wire disclosed in Patent Literature 1 does not function as an electric power cable to supply electric power. Thus, the charge unit cannot charge the battery without the connection between a connector unit of the elevation device and a connector unit of the illumination device. Thus, the charge unit may not be able to supply sufficient electric power to light-emitting element(s) due to the large number of light-emitting element(s) elevated by the elevation device and/or the long time of the stage representation etc.

An illumination system according to one embodiment includes: an elevation device that has a reel wire extending downwardly and that changes a length of the reel wire; and an illumination device that is connected to the reel wire and that is elevated by a change of the length of the reel wire. Electric power is supplied from a power supply through the reel wire to the illumination device. The illumination device includes: a battery for receiving the electric power supplied via the reel wire to store the electric power; and a light-emitting element for receiving the electric power supplied through the reel wire and the electric power supplied from the battery to emit light.

A method according to one embodiment includes a method performed by an illumination system, comprising: changing a length of a reel wire extending downwardly; elevating an illumination device connected to the reel wire by changing the length of the reel wire; supplying electric power from a power supply through the reel wire to the illumination device; storing the electric power supplied through the reel wire in a battery; and causing a light-emitting element to emit light using the electric power supplied through the reel wire and the electric power supplied from the battery.

The illumination system and the illumination method according to the present embodiment can supply sufficient electric power to a light-emitting element regardless of the length of the diameter of a reel wire that supplies electric power to the light-emitting element.

BRIEF DESCRIPTION OF DRAWINGS

FIG. 8 illustrates a state changed in accordance with operations performed by the illumination system according to one embodiment;

DESCRIPTION OF EMBODIMENTS

With reference to the attached drawings, the following section will describe an illumination system 10 according to one embodiment. The illumination system 10 is mainly used in a stage representation to support performers performing a representation for a theatrical play, music, and dance for example. In such a stage representation, the illumination system 10 allows a light-emitting element to emit light and controls the light thereby providing illumination representation.

Figure 1:
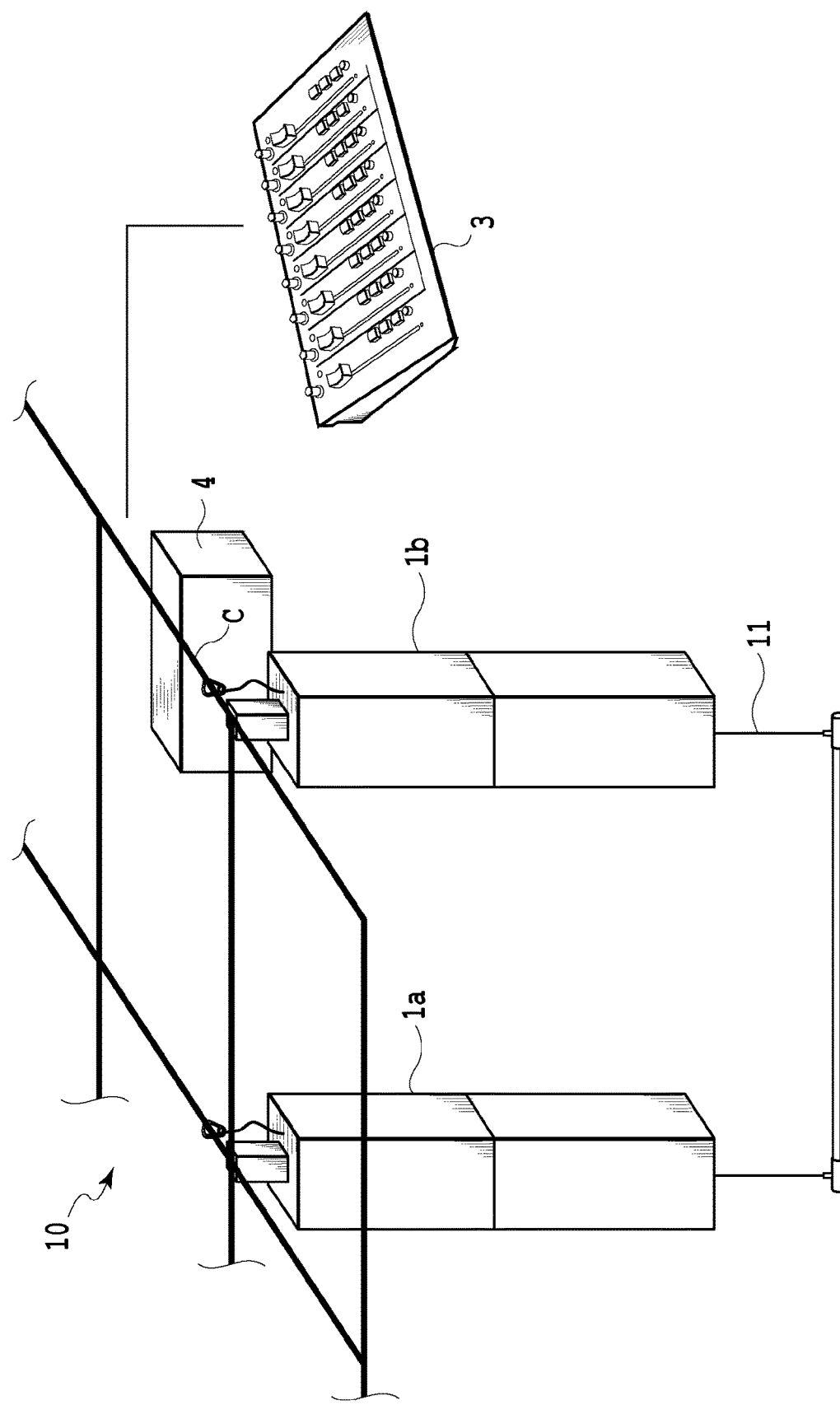
FIG. 1 illustrates the entirety of an illumination system according to one embodiment.

FIG. 1 illustrates the entirety of the illumination system 10. The illumination system 10 includes elevation devices 1a and 1b (hereinafter referred to as an elevation device 1), an illumination device 2, a controller 3, and a power supply 4. The numbers of the elevation device 1 and the illumination device 2 shown in FIG. 1 are merely illustrative. The two elevation devices 1 and the one illumination device 2 shown in FIG. 1 may be combined in a plurality of combinations. The relation between the elevation device 1 and the illumination device may be in a one-to-one relation, N-to-N relation, or one-to-N relation (where N is an arbitrary number larger than or equal to 2).

The elevation device 1 includes a reel wire 11 provided therein. The reel wire 11 extends from the elevation device 1 downwardly. The reel wire 11 has a tip end attached with the illumination device 2. The illumination device 2 is suspended from the elevation device 1 downwardly. From the viewpoint of the representation, the elevation device 1 is preferably provided at a height so that the elevation device 1 suspended from a ceiling C cannot be or is difficult to be visually recognized for a viewer.

The elevation device 1 changes the length of the reel wire 11 to elevate the illumination device 2 attached to the tip end of the reel wire 11. The elevation device 1 is attached to the ceiling C such that its longitudinal direction is in a vertical state. In this embodiment, an example is illustrated in which the elevation device 1 is attached to the ceiling. Another configuration also may be used in which the elevation device 1 is attached to a suspension baton instead of the ceiling. The suspension baton is a grid-like apparatus used in a stage representation for example and will not be further described in detail.

The illumination device 2 has a bar-like shape and includes one or a plurality of light-emitting element(s) provided therein. The illumination device 2 includes connectors at both ends in the longitudinal direction and are connected to the two reel wires 11 via the connectors, respectively. In the state shown in FIG. 1, the illumination device 2 has both ends in the longitudinal direction connected to the two reel wires 11, respectively. Specifically, the illumination device 2 shown in FIG. 1 is elevated by both of the two elevation devices 1 changing the length of the reel wire 11. However, only one end of the illumination device 2 also may be connected to the reel wire 11. In this case, the illumination device 2 is suspended such that its longitudinal direction is in a vertical state.

The controller 3 controls the operations of the elevation device 1 and the illumination device 2. The elevation device 1 and the controller 3 are connected in a wired or wireless manner. The controller 3 is implemented by a CPU (Central Processing Unit) or an FPGA (Field Programmable Gate Array) for example. The controller 3 executes a control program stored in a memory (not shown). The operations of the elevation device 1 and the illumination device 2 are controlled based on representation data stored in a storage (not shown) and/or in response to the operation by an operator (the controller 3 transmits a control signal to the elevation device 1 and the illumination device 2). The representation data defines the operations of the elevation device 1 and the illumination device 2 based on a predetermined stage representation.

The control signal from the controller 3 is directly transmitted to the elevation device 1. The control signal from the controller 3 is transmitted to the illumination device 2 via the elevation device 1 and the reel wire 11. In this embodiment, the operation of the illumination device 2 is controlled based on the control signal transmitted from the controller 3 via the reel wire 11. However, the invention is not limited to this embodiment. For example, the illumination device 2 and the controller 3 may be connected in a wired or wireless manner and the control signal may be directly transmitted to the illumination device 2.

The controller 3 includes an input device and an output device (not shown). The input device and the output device are used by the operator. The operator moves, in accordance with a stage representation, an operation to move the illumination device 2 to a predetermined height (via the operation of the elevation device 1) to cause the illumination device 2 to emit light for example. The input device is to input an instruction to perform such an operation. The output device is to display the result of the operations of the elevation device 1 and the illumination device 2 for example.

The power supply 4 corresponds to a power source to supply electric power to the elevation device 1 and the illumination device 2. The power supply 4 is connected to a power source outlet provided in the ceiling C for example. The elevation device 1 is connected to the power supply 4 via a power source cable. The electric power from the power supply 4 is directly supplied to the elevation device 1. The electric power from the power supply 4 is supplied to the illumination device 2 through the elevation device 1 and the reel wire 11.

During a stage representation, the illumination device 2 is lowered to a position at which the illumination device 2 can be visually recognized for a viewer and the illumination device 2 emits light. Thus, attaching a component such as power supply 4 to the illumination device 2 is not preferred from the viewpoint of the representation because the component can be visually recognized for a viewer. In this embodiment, the elevation device 1 is provided at a position so that the elevation device 1 cannot be or is difficult to be visually recognized for a viewer. Thus, the electric power supplied from the elevation device 1 through the reel wire 11 to the illumination device 2 eliminates the need to attach the above-described component to the illumination device 2.

Figure 2:
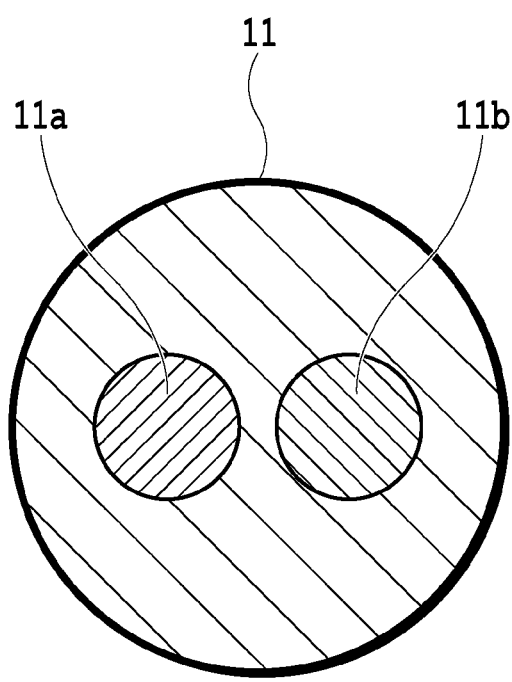
FIG. 2 illustrates the cross section of a reel wire according to one embodiment.

As shown in FIG. 2, the reel wire 11 includes therein a control line 11a for transmitting a control signal to the illumination device 2 and an electric power line 11b for supplying electric power to the illumination device 2. FIG. 2 is a cross-sectional view illustrating the reel wire 11. As shown in FIG. 1, when both ends of the illumination device 2 are connected to two reel wires 11, a control signal may be transmitted from only one of the two control lines 11a or the electric power may be supplied from any or both of the two electric power lines 11b.

Figure 3:
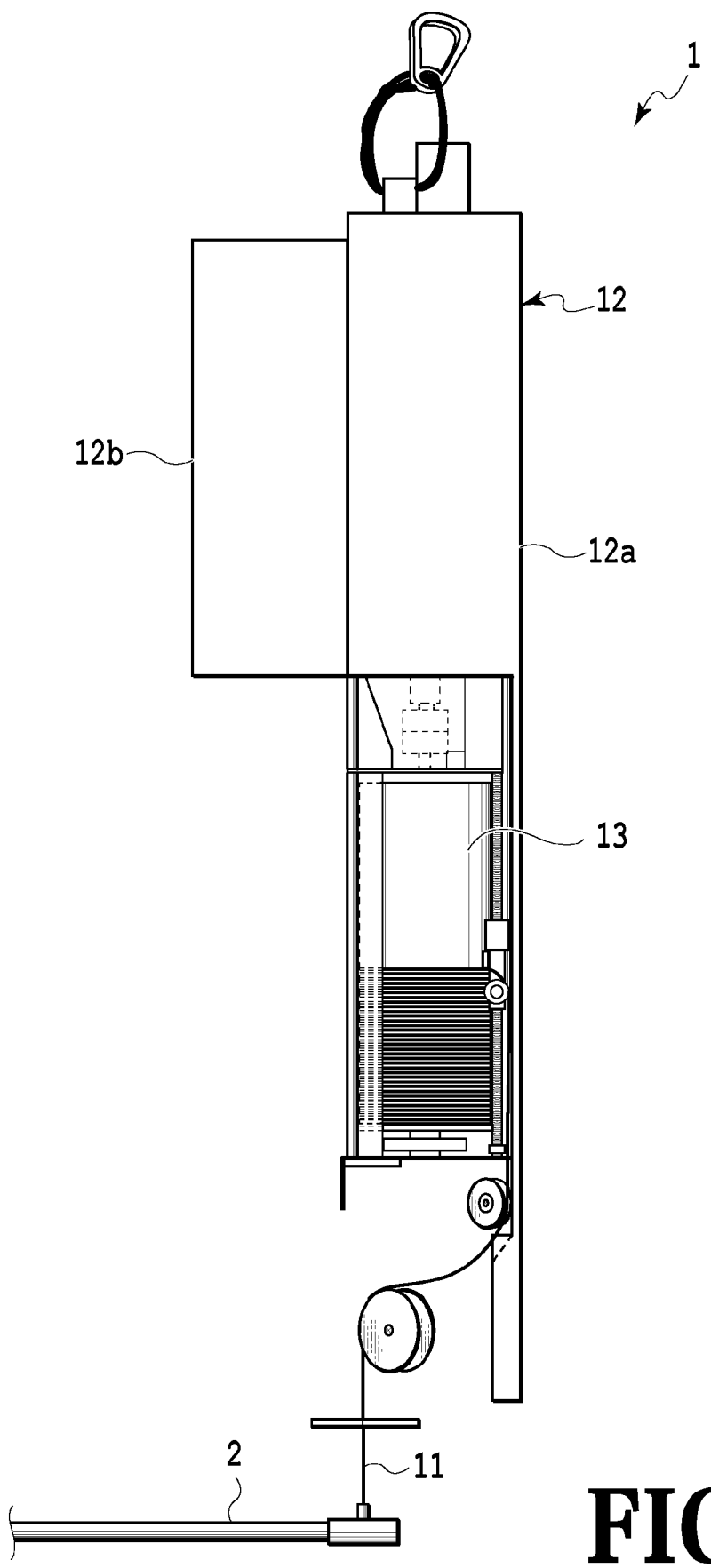
FIG. 3 illustrates a housing of an elevation device opened according to one embodiment.

Next, with reference to FIG. 3, the detailed structure of the elevation device 1 will be described. FIG. 3 illustrates the state in which the housing of the elevation device 1 is opened. The elevation device 1 has a housing 12 including an upper unit 12a and a lower unit 12b. The elevation device 1 shown in FIG. 1 is in a state in which the lower unit 12b is closed and components provided in the elevation device 1 are covered by the housing 12. For the purpose of maintenance for example, the lower unit 12b can be opened. As shown in FIG. 3, when the lower unit 12b is opened, the components provided in the elevation device 1 can be visually recognized.

As shown in FIG. 3, the elevation device 1 includes a reel 13 provided in the housing 12. The reel 13 has a cylindrical shape and is provided so that its longitudinal direction is parallel to the longitudinal direction of the housing 12. The reel 13 is connected to the rotation axis of an electric motor (not shown). The electric motor is driven to rotate the reel 13 around an axis of a plane in a short end direction. The rotation of the reel 13 winds the reel wire 11 around the reel 13 to form a single winding. The rotation of the reel 13 in an opposite direction unwinds the reel wire 11 from the reel 13.

The reel wire 11 wound and unwound around the reel 13 as described above causes a change in the length of the reel wire 11 to elevate the illumination device 2 attached to the tip end of the reel wire 11. In particular, in an example in which the two elevation devices 1 are used to elevate the one illumination device 2 as in the example shown in FIG. 1, respective two elevation devices 1 change the lengths of the respective reel wires 11 with different speeds and/or amounts, thereby providing a change in the angle of the illumination device 2 to provide various representations.

Driving the electric motor is controlled by a control circuit (not shown) provided in the elevation device 1 based on a control signal from the controller 3. This control signal includes an instruction signal to rotate the reel 13 relative to the elevation device 1 with predetermined speed, amount, direction, and/or timing for example. The control circuit includes a detection circuit (not shown) such as a rotary encoder (not shown). The control circuit calculates the rotation amount of the rotation axis of the electric motor to determine the travel distance of the illumination device 2 in an upward direction and downward direction. The control of the elevation device 1 as described above allows the illumination system 10 to move, in accordance with a stage representation, the illumination device 2 to a predetermined position in the an upward direction and downward direction and to incline the illumination device 2 at a predetermined angle.

In an actual stage representation, when no illumination representation using the illumination system 10 is performed based on predetermined representation data, the illumination device 2 is lifted to a predetermined height and the illumination device 2 is completely turned OFF. This state is called a representation OFF mode. On the other hand, when a illumination representation using the illumination system 10 is performed based on the predetermined representation data, the illumination device 2 is lowered to a predetermined height and the illumination device 2 emits the light (including flashing). This state is called a representation ON mode.

Figure 4:
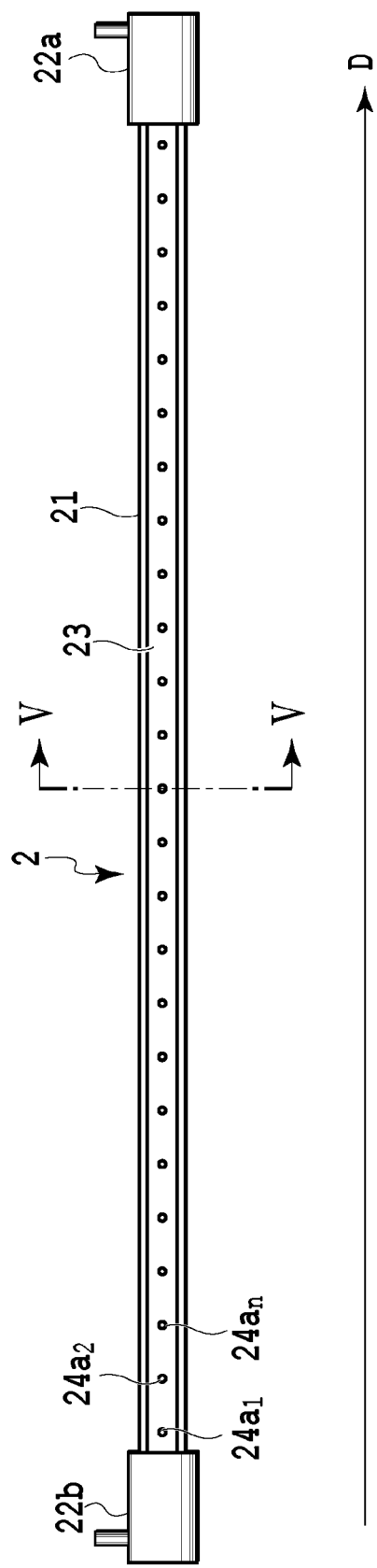
FIG. 4 illustrates a side face of an illumination device according to one embodiment.

Next, with reference to FIG. 4, the detailed structure of the illumination device 2 will be described. FIG. 4 illustrates a side face of the illumination device 2 in the longitudinal direction. The illumination device 2 includes: a main body 21, connectors 22a and 22b (hereinafter referred to as a connector 22), a substrate 23, as well as light-emitting elements $24a_1$ and $24a_2$, and $24a_n$ (hereinafter referred to as a light-emitting element 24a).

The main body 21 is a housing that has a bar-like shape and that extends in the direction indicated by an arrow D. The main body 21 has a hollow structure that can accommodate therein the substrate 23 and the light-emitting element 24a for example. The two connectors 22 are attached to both ends of the main body 21 in the longitudinal direction (the connector 22a is attached to one end and the connector 22b is attached to the other end). The connector 22 has a mechanical structure to connect the illumination device 2 and the reel wire 11. The connector 22 transmits, to the substrate 23, a control signal transmitted through the control line 11a and the electric power supplied through the electric power line 11b. As described above, when only one end of the illumination device 2 is connected to the reel wire 11, only one connector 22 may be attached to one end of the main body 21.

The substrate 23 is a mounting substrate extending in an arrow D. The substrate 23 has a printed substrate provided on a side face in the longitudinal direction. The printed substrate has thereon a plurality of the light-emitting elements 24a provided via a wiring in the direction indicated by the arrow D with a predetermined interval. Each of the light-emitting elements 24 receives a control signal transmitted through the control line 11a via the connector 22. Each of the light-emitting element 24 receives the electric power supplied through the electric power line 11b via the connector 22. The light-emitting element 24a may be implemented by light-emitting material such as LED and an IC chip.

Figure 5:
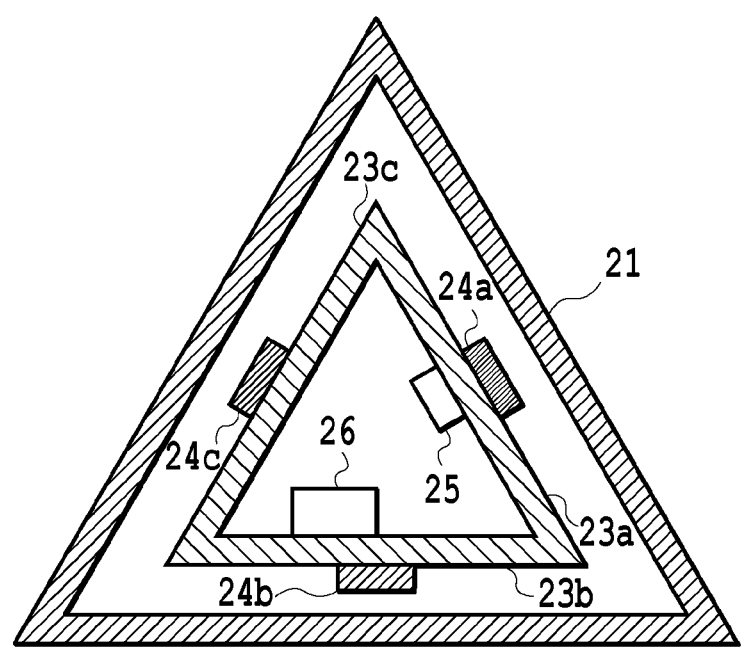
FIG. 5 illustrates the cross section of the illumination device according to one embodiment.

Next, with reference to FIG. 5, the detailed internal structure of the illumination device 2 will be described. FIG. 5 is a cross-sectional view (in a cross section taken along the line V-V of FIG. 4) illustrating the illumination device 2 in the short end direction (i.e., in a direction orthogonal to the arrow D shown in FIG. 4). As shown in FIG. 5, the main body 21 has a triangular cross section in the short end direction. This cross-sectional shape is formed by arranging three rectangular acrylic plates for example so that side faces in the longitudinal direction are mutually opposed to one another. The cross section of the main body 21 in the short end direction is not limited to the triangular shape and may have other shapes such as circular, square, and pentagon shapes. For example, when the main body 21 has a square cross-sectional shape in the short end direction, the main body 21 may be formed by four rectangular acrylic plates for example.

The substrate 23 also has a triangular cross-sectional shape in the short end direction. This shape is formed by arranging the three substrates 23a, 23b, and 23c so that the side faces in the longitudinal direction are mutually opposed to one another. The shape formed by the substrates 23a, 23b, and 23c has a hollow structure that can accommodate therein a control circuit 25 and a battery 26 described below. The cross-sectional shape of the substrate 23 in the short end direction is not limited to the triangular shape and may be any shape such as circular, square, and pentagon shapes. For example, when the substrate 23 has a square cross-sectional shape in the short end direction, the substrate 23 is formed by four substrates.

As described in FIG. 4, the substrate 23a has a plurality of the light-emitting elements 24a provided on a side face of the substrate 23a in the longitudinal direction. Similarly, the substrates 23b and 23c have, on the side face in the longitudinal direction, a plurality of light-emitting elements 24b ($24b_1$, $24b_2$, and $24b_n$ (hereinafter referred to as a light-emitting element 24b)), and a light-emitting element 23c ($24c_1$, $24c_2$, and $24c_n$ (hereinafter referred to as a light-emitting element 24c)), respectively. Specifically, the substrate 23 has a plurality of the light-emitting elements 24a, 24b, and 24c provided on three side faces in the longitudinal direction, respectively. This means that the illumination device 2 emits the light from the three side faces of the substrate 23. In the following section, the side faces of the substrates 23a, 23b, and 23c in the longitudinal direction on which the light-emitting element 24 is provided will be called a surface.

When the substrate 23 has a square cross-sectional shape in the short end direction, four substrates 23 have light-emitting elements 24, respectively. In this case, the illumination device 2 emits the light from four side faces of the substrate 23 in four directions.

A printed substrate is also provided on surface(s) opposite to any or all surface(s) of the substrates 23a, 23b, and 23c (hereinafter referred to as a back face). The printed substrate at the back face of the substrate 23a has the control circuit 25 provided through a wiring. The printed substrate at the back face of the substrate 23b has the battery 26 provided through a wiring. Specifically, the control circuit 25 and the battery 26 are provided in a hollow structure formed by the substrates 23a, 23b, and 23c. In the state where the substrates 23 are accommodated in the main body 21, the control circuit 25 and the battery 26 are covered by the substrates 23a, 23b, and 23c and cannot be visually recognized.

As described above, the illumination system 10 performs a illumination representation. Thus, the control circuit 25 and the battery 26 visually recognized for a viewer are not preferred from the viewpoint of representation. In this embodiment, the substrate 23 has an internal hollow structure to cover the control circuit 25 and the battery 26 accommodated therein, thus preventing the control circuit 25 and the battery 26 from visually recognized for a viewer. In this embodiment, the control circuit 25 is provided on the back face of the substrate 23a and the battery 26 is provided on the back face of the substrate 23b. However, the control circuit 25 and the battery 26 also may be provided at the back face of any of the substrates 23a, 23b, and 23c.

Based on the control signal transmitted through the control line 11a, the control circuit 25 controls the light emission (including flashing), light intensity, and light color of each light-emitting element 24. Each light-emitting element 24 emits the light using the electric power supplied from the electric power line 11b and the electric power supplied from the battery 26. Based on the control signal from the control line 11a, the control circuit 25 allocates the electric power supplied from the electric power line 11b to the light-emitting element 24 or the battery 26.

The battery 26 is a secondary battery to store the electric power supplied from the electric power line 11b. The battery 26 includes an IC chip (not shown) that measures a remaining battery to supply the electric power to the light-emitting element 24 based on an instruction signal from the control circuit 25.

Figure 6:
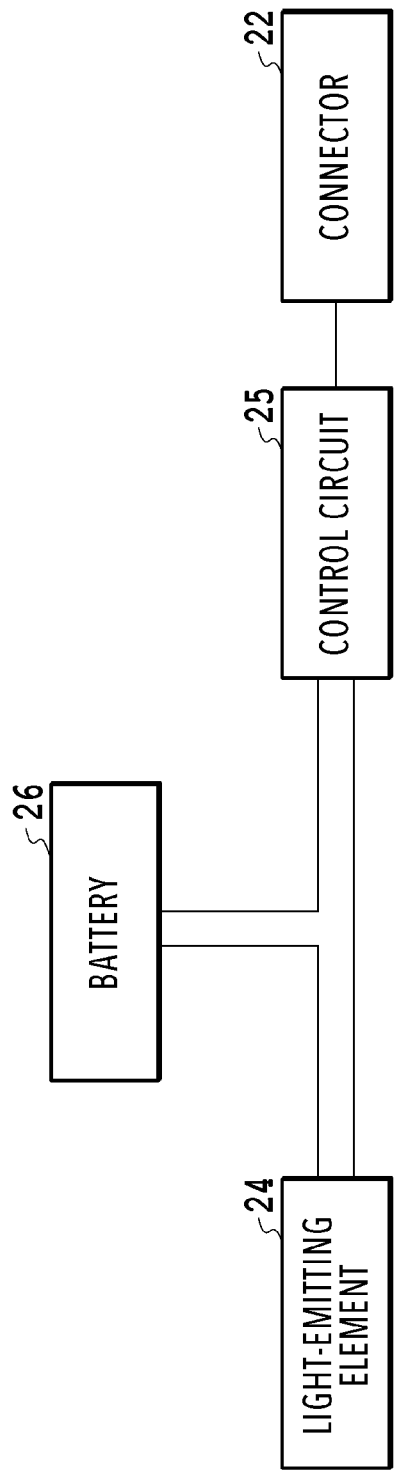
FIG. 6 illustrates the logical structure of the illumination device according to one embodiment.

Next, with reference to FIG. 6, the logical structure of the above-described components of the illumination device 2 will be described. As shown in FIG. 6, the control circuit 25 is coupled to a connector 22 via the control line and the electric power line. The control circuit 25 receives a control signal (transmitted from the controller 3 through the control line 11a) from the connector 22 through the control line and receives the electric power (supplied from the power supply 4 through the electric power line 11b) from the connector 22 through an electric power line.

The control signal transmitted through the control line 11a to the control circuit 25 includes a signal to instruct the light-emitting element 24 to emit the light at predetermined light quantity and/or time for example. Specifically, the control circuit 25 instructs, based on a control signal from the controller 3, the light-emitting element 24 to emit the light (with predetermined light quantity, color, and/or timing for example). The control circuit 25 determines whether or not the control signal is to instruct the light-emitting element 24. Then, the control circuit 25 transmits an instruction signal to the light-emitting element 24.

Also, in response to receiving the above-described control signal, the control circuit 25 instructs the battery 26 to perform a charging operation and to supply the electric power to the light-emitting element 24. Then, the control circuit 25 instructs that the time and timing at which the electric power is supplied from the battery 26 to light-emitting element 24 are synchronized with the time and timing indicated by the control signal from the controller 3 at which the light is emitted from the light-emitting element 24 for example.

The light-emitting element 24 is coupled to the control circuit 25 via the control line and the electric power line. The light-emitting element 24 receives the instruction signal from the control circuit 25 through the control line and receives the electric power from the control circuit 25 through the electric power line. The light-emitting element 24 emits the light based on the instruction signal from the control circuit 25. The light-emitting element 24 is coupled to the battery 26 via the electric power line. The light-emitting element 24 receives the electric power supplied from the battery 26. Specifically, the light-emitting element 24 receives both of the electric power from the control circuit 25 (electric power from the power supply 4) and the electric power from the battery 26 (electric power stored in the battery 26).

The battery 26 is coupled to the control circuit 25 via the control line and the electric power line. The battery 26 receives the instruction signal from the control circuit 25 through the control line and receives the electric power from the control circuit 25 through the electric power line (electric power from the power supply 4). The battery 26 stores the electric power from the control circuit 25 and supplies the electric power to the light-emitting element 24 based on the instruction signal from the control circuit 25.

The battery 26 measures the remaining battery thereof. When the electric power stored therein reaches a predetermined amount, then the battery 26 transmits, to the control circuit 25, a charge-completed signal indicating the completion of the charge. Thereafter, when the stored electric power is lower than a predetermined amount due to the supply of the electric power from the battery 26 to the light-emitting element 24, then the battery 26 transmits, to the control circuit 25, a charge restart signal indicating that a charging operation is required. Upon receiving the charge-completed signal, the control circuit 25 determines that the battery 26 is in a charge OFF mode. Upon receiving the charge restart signal, the control circuit 25 determines that the battery 26 is in a charge ON mode. Unless the charge-completed signal is received, the control circuit 25 determines that the battery 26 is in the charge ON mode. The charge ON mode and the charge OFF mode are collectively called a charge mode.

The control signal transmitted from the controller 3 to the control circuit 25 may include a signal to instruct the battery 26 to perform a charge operation and to supply the electric power to the light-emitting element 24 (including the time and/or timing at which the electric power is supplied). Specifically, the controller 3 may instruct the battery 26 to perform a charge operation and to supply the electric power to the light-emitting element 24. In this case, the control circuit 25 determines whether or not the control signal is to instruct the battery 26 and transmits the instruction signal to the battery 26. In this case, the above-described charge-completed signal and charge restart signal are transmitted from the control circuit 25 to the controller 3 through the control line 11a. The controller 3 determines whether or not the battery 26 is in any of the charge ON mode of the charge OFF mode.

Figure 7:
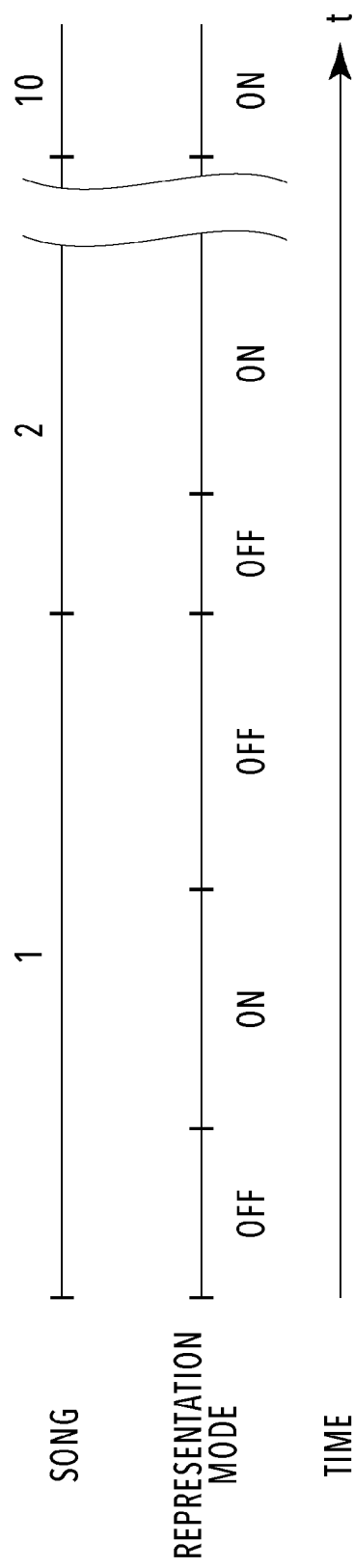
FIG. 7 illustrates a transition between representation modes according to one embodiment.

Next, with reference to FIG. 7, the relation between a representation ON mode and a representation OFF mode in a stage representation will be described (the representation ON mode and the representation OFF mode will be collectively referred to as a representation mode). FIG. 7 illustrates the transition between the representation modes in a time-series manner. In the example of FIG. 7, the illumination system 10 is used for a music stage representation in which a performer sings 10 songs.

When the performer sings the respective 10 songs, the illumination system 10 transits between the representation modes among the respective singing performances. In the example shown in FIG. 7, the illumination system 10 transits from the representation OFF mode to the representation ON mode after one minute from the start of the first song and transits again from the representation ON mode to the representation OFF mode after 1.5 minute. Specifically, within 1 minute from the start of the singing performance of the first song, the illumination device 2 is positioned at a predetermined height upwardly and the illumination device 2 is completely OFF. After another 1 minute has passed, the illumination device 2 is lowered to a predetermined height and the illumination device 2 emits the light (including flashing). When another 1.5 minutes have passed, the illumination device 2 is lifted to a predetermined height and the illumination device 2 is completely turned OFF.

The transition between the representation modes is performed in accordance with a predetermined timing or the state of the performer or the stage representation (e.g., at the timing at which the first phrase of a song sung by the performer is completed). The transition between the modes may be determined based on the instruction inputted by the operator via the controller 3 (i.e., based on a manual operation) or based on predetermined representation data stored in the controller 3 (i.e., based on an automatic judgement).

Next, with reference to FIG. 8, the relation among the representation mode, the charge mode, the charging state of the battery 26, and the state in which the electric power is supplied to the light-emitting element 24 will be described. FIG. 8 illustrates the state changed in accordance with the operations performed by the illumination system 10. As described above, the battery 26 transits between the charge ON mode and the charge OFF mode.

As described above, when the battery 26 is in the charge ON mode, the battery 2 needs to be charged. As shown in FIG. 8, when the battery 26 is in the charge ON mode and the illumination system 10 is in the representation ON mode, the electric power needs to be supplied to the light-emitting element 24. Thus, no charging operation is performed on the battery 26. On the other hand, the electric power is supplied to the light-emitting element 24. The electric power is supplied from both of the control circuit 25 (the electric power from the power supply 4) and the battery 26 (the electric power accumulated in the battery 26).

When the battery 26 is in the charge ON mode and the illumination system 10 is in the representation OFF mode, no electricity power supply is required for the light-emitting element 24, thus supplying no electricity power to the light-emitting element 24. On the other hand, the electric power from the control circuit 25 is allocated to the battery 26 to charge the battery 26.

When the battery 26 is in the charge OFF mode and the illumination system 10 is in the representation ON mode, the electric power needs to be supplied to the light-emitting element 24. Thus, no charging operation is performed on the battery 26. On the other hand, the electric power is supplied to the light-emitting element 24 from both of the control circuit 25 (the electric power from the power supply 4) and the battery 26 (the electric power accumulated in the battery 26).

When the battery 26 is in the charge OFF mode and the illumination system 10 is in the representation OFF mode, no electric power supply is required for the light-emitting element 24. Thus, no electric power supply is supplied to the light-emitting element 24 and no charging operation is performed on the battery 26.

As described above, when the illumination system 10 is not used in a stage representation (i.e., when no electric power supply is required for the light-emitting element 24), the battery 26 stores the electric power. When the illumination system 10 is used (i.e., when the electric power need to be supplied to the light-emitting element 24), not only the electric power from the power supply 4 but also the electric power stored in the battery 26 are supplied to the light-emitting element 24. Specifically, while the illumination system 10 is not being used, the battery 26 stores the electric power and, when the illumination system 10 is being used, the stored electric power is supplied to the light-emitting element 24.

As described above, in the case of a stage representation method according to the prior art, an illumination device suspended from an elevation device receives the electric power supplied via a reel wire connecting the elevation device and the illumination device. Thus, sufficient electric power may not supplied to the illumination device due to a small diameter of the reel wire. The illumination system 10 according to this embodiment is configured so that both of the electric power from the power supply 4 and the electric power accumulated in the battery 26 are supplied to the light-emitting element 24. Thus, sufficient electric power can be supplied to the light-emitting element 24 regardless of the diameter of the reel wire 11. This consequently allows the light-emitting element 24 to contain much more light-emitting elements 24, thus providing a more gorgeous representation.

Figure 9:
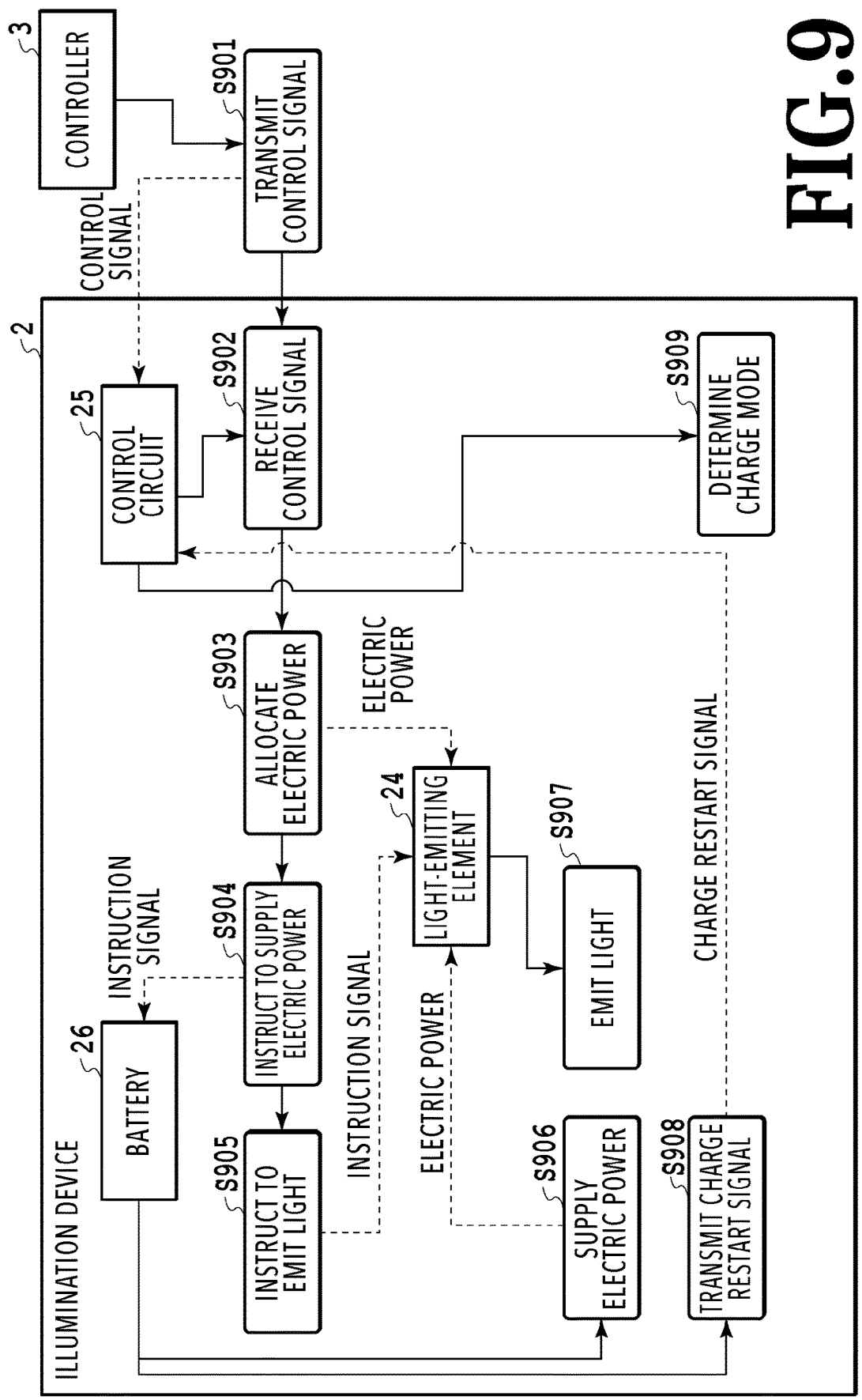
FIG. 9 illustrates operations performed by the illumination system according to one embodiment.

Next, with reference to FIG. 9, the operations performed by the illumination system 10 will be described. In the description of FIG. 9, the detailed operations performed by the elevation device 1 are not further described and an example of the operations performed by the illumination device 2 and the controller 3 is shown. The operations shown in FIG. 9 are based on an assumption that as described in FIG. 7, the performer sings the first song for example. Specifically, in the operations in FIG. 9, the illumination system 10 transits from the representation OFF mode to the representation ON mode. It is assumed that the battery 26 is in the charge OFF mode at the start of the operation. It is assumed that the illumination device 2 receives the electric power from the power supply 4 through the electric power line 11b.

First, the controller 3 transmits a control signal to the elevation device 1 and the illumination device 2 based on representation data or in response to the input of an instruction by an operator (Step S901). This control signal includes an instruction signal to instruct the elevation device 1 to rotate the reel 13 and an instruction signal to instruct the illumination device 2 to cause the light-emitting element 24 to emit the light for example (i.e., a transition from the representation OFF mode to the representation ON mode). In response to this control signal, the elevation device 1 causes the reel 13 to rotate to lower the illumination device 2 to a predetermined height.

Next, the control circuit 25 receives the control signal transmitted in Step S901 from the connector 22 through the control line 11a (Step S902). Next, in response to the control signal received in Step S902, the control circuit 25 allocates, to the light-emitting element 24, the electric power received from the connector 22 through the electric power line 11b (Step S903). Then, the control circuit 25 instructs the battery 26 to supply electric power to the light-emitting element 24 (Step S904) and instructs the light-emitting element 24 to emit the light (Step S905).

Next, in response to instruction from the control circuit 25, the battery 26 supplies the electric power to the light-emitting element 24 (Step S906). The light-emitting element 24 receives the electric power from the control circuit 25 in Step S903 and the electric power from the battery 26 in Step S906 to emit the light with a predetermined light quantity for example (Step S907). Thereafter, the light-emitting element 24 continuously emits the light (flashing) for a predetermined period of time. During this light emission, the battery 26 measures its remaining battery. When the electric power stored in the battery 26 is lower than a predetermined amount, the battery 26 transmits a charge restart signal to the control circuit 25 (Step S908). In response to the charge restart signal, the control circuit 25 determines that the battery 26 in the charge ON mode (Step S909).

Figure 10:
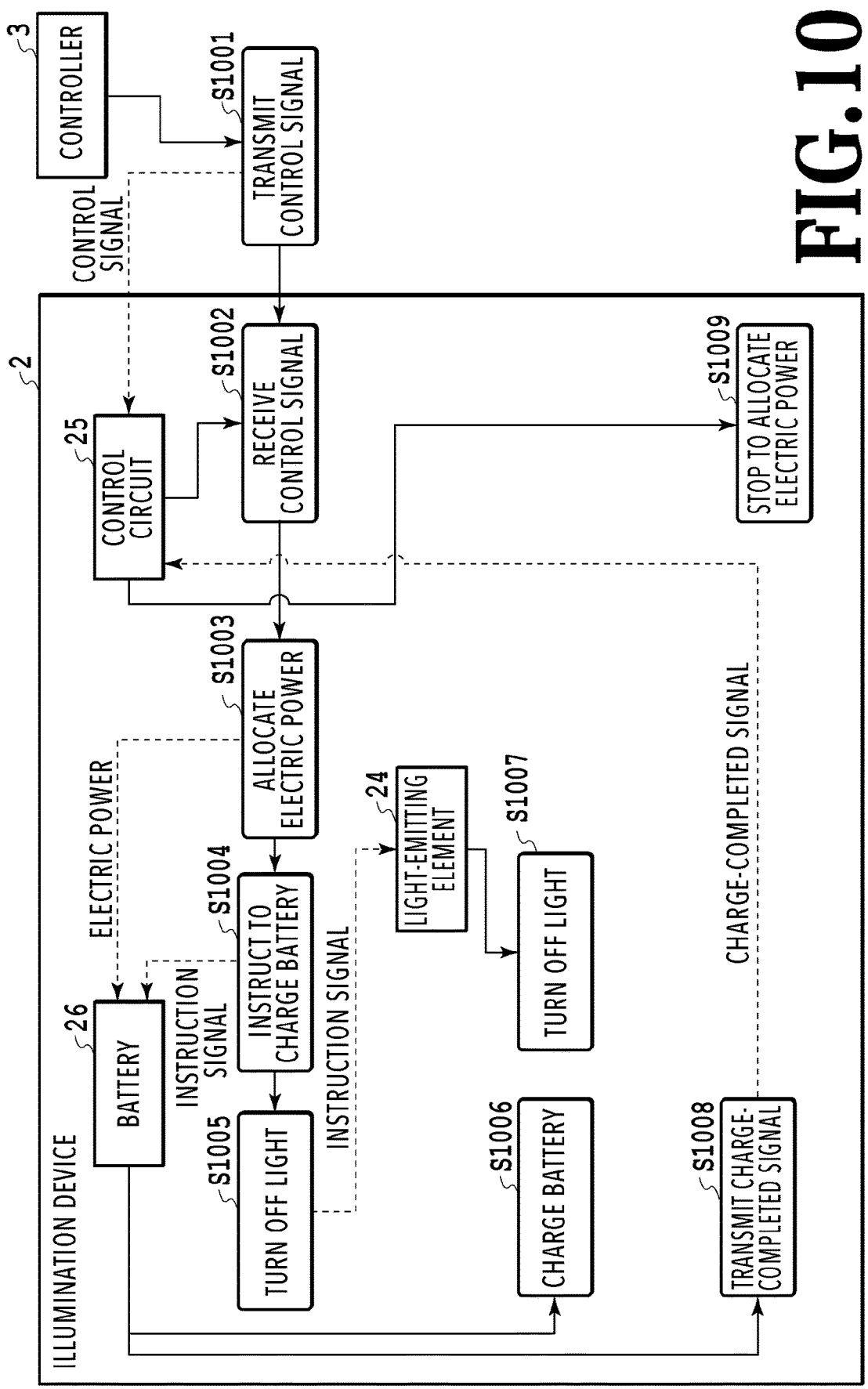
FIG. 10 illustrates operations performed by the illumination system according to one embodiment.

Next, with reference to FIG. 10, the operations performed by the illumination system 10. In the operations described in FIG. 10 after the operations in FIG. 9, the illumination system 10 transits from the representation ON mode to the representation OFF mode again. It is assumed that the battery 26 is in the charge ON mode.

First, the controller 3 transmits, based on the representation data or in response to an instruction inputted by the operator, a control signal to the elevation device 1 and the illumination device 2 (Step S1001). This control signal includes an instruction signal to instruct the elevation device 1 to rotate the reel 13 (in a direction opposite to the direction of the rotation in Step S901 of FIG. 9) and an instruction signal to instruct the illumination device 2 to turn OFF the light-emitting element 24 (i.e., a transition from the representation ON mode to the representation OFF mode). In response to this control signal, the elevation device 1 causes the reel 13 to rotate to lift the illumination device 2 to a predetermined height.

Next, the control circuit 25 receives the control signal transmitted in Step S1001 from the connector 22 through the control line 11a (Step S1002). Next, in response to the control signal received in Step S1002, based on the determination that the battery 26 is in the charge ON mode, the control circuit 25 allocates, to the battery 26, the electric power received from the connector 22 through the electric power line 11b (Step S1003). Then, the control circuit 25 instructs the battery 26 to perform a charging operation (Step S1004) and instructs the light-emitting element 24 to turn OFF (Step S1005).

Next, in response to the instruction from the control circuit 25, the battery 26 stores the electric power from the control circuit 25 (Step S1006). In response to the instruction from the control circuit 25, the light-emitting element 24 is turned OFF (Step S1007). During the charging operation in Step S1006, the battery 26 measures its remaining battery. When the electric power stored in the battery 26 is higher than a predetermined amount, the battery 26 transmits the charge-completed signal to the control circuit 25 (Step S1008). In response to the charge-completed signal, the control circuit 25 determined that the battery 26 is in the charge OFF mode and stops to allocate the electric power received from the connector 22 to the battery 26 (Step S1009).

As described above, an example of the operations performed by the illumination system 10 have been described according to this embodiment. In the above-described embodiment, the charging operation of the battery 26 is triggered by the transition of the illumination system 10 to the representation OFF mode. However, the invention is not limited to this embodiment. For example, the illumination device also may be turned OFF within a predetermined period when the illumination system 10 is in the representation ON mode. The electric power from the power supply 4 may be allocated to the battery 26 to charge the battery 26 within such a period. The configuration as described above can increase the electric power efficiency for the illumination system 10.

Some representations may include various light emission patterns during the representation and thus a period exists in which the light is emitted only from some of a plurality of light-emitting elements 24 provided in the illumination device 2. If the electric power supplied from the power supply 4 to the light-emitting element 24 can supply electric power sufficient for these light-emitting elements 24 to emit light within such a period, the electric power from the power supply 4 may be allocated to the light-emitting element 24 and the electric power supply from the battery 26 to the light-emitting element 24 may be stopped. The configuration as described above can save the consumption of the electric power in the battery 26, thus increasing the electric power efficiency for illumination system 10.

When the illumination system 10 is not used, the illumination device 2 is lifted to a predetermined height. In response to the illumination device 2 reaching the predetermined height upwardly, the electric power from the power supply 4 may be allocated to the battery 26 to charge the battery 26. On the other hand, when the illumination system 10 is used the illumination device 2 is lowered to a predetermined height. In response to the illumination device 2 reaching the predetermined height downwardly, the electric power from the power supply 4 may be allocated to the light-emitting element 24 to supply electric power from the battery 26 to the light-emitting element 24.

The above-described determination of the height at which the illumination device 2 is lifted or lowered may be performed by a detection unit of the elevation device 1 based on the rotation amount of the rotary encoder. Alternatively, a position at which the elevation device 1 reaches after being lifted may have a mechanical contact or an electrical contact having a contact with the illumination device 2 so that the illumination device 2 having a contact with the contact or losing contact with the contact may be detected. In this case, in response to the detection by the elevation device 1 that the illumination device 2 has a contact with the contact, the controller 3 instructs the above-described charging operation of the battery 26. On the other hand, in response to the detection by the elevation device 1 that the illumination device loses a contact with the contact, the controller 3 may instruct the supply of electric power from the battery 26 to the light-emitting element 24.

In this embodiment, the illumination device 2 has a bar-like shape as described above. The shape of the illumination device 2 is not limited to such a shape and may have an arbitrary shape. Regardless of the shape of the illumination device 2, the shape formed by the substrates 23 in which the light-emitting elements 24 are accommodated therein preferably has a hollow structure to accommodate the control circuit 25 and the battery 26.

REFERENCE SIGNS LIST

1 Elevation device
1a Elevation device
1b Elevation device
2 Illumination device
3 Controller
4 Power supply
10 Illumination system
11 Reel wire
11a Control line
11b Electric power line
12 Housing
12a Upper unit
12b Lower unit
13 Reel
22 Connector
22a Connector
22b Connector
23 Substrate
23a Substrate
23b Substrate
23c Substrate
24 Light-emitting element
24a Light-emitting element
24b Light-emitting element
24c Light-emitting element
25 Control circuit
26 Battery

The invention claimed is:

1. An illumination system, comprising:
   an elevation device that has a reel wire extending downwardly and that changes a length of the reel wire; and
   an illumination device that is connected to the reel wire and that is elevated by a change of the length of the reel wire,
   wherein electric power is supplied from a power supply through the reel wire to the illumination device,
   the illumination device includes:
   a battery for receiving the electric power supplied via the reel wire to store the electric power; and
   a light-emitting element for receiving the electric power supplied through the reel wire and the electric power supplied from the battery to emit light.

2. The illumination system according to claim 1, wherein the illumination device further includes:
   a control circuit for receiving the electric power supplied through the reel wire to allocate the received electric power to the light-emitting element or the battery.

3. The illumination system according to claim 2, wherein the control circuit, in response to determining that an amount of electric power stored in the battery is lower than a predetermined amount, allocates the received electric power to the battery.

4. The illumination system according to claim 2, wherein the control circuit, in response to receiving a signal to instruct the light-emitting element to emit the light, allocates the received electric power to the light-emitting element and instructs the battery to supply the accumulated electric power to the light-emitting element.

5. The illumination system according to claim 2, wherein the control circuit, in response to receiving a signal for instructing the light-emitting element to turn OFF, allocates the received electric power to the battery.

6. The illumination system according to claim 2, wherein the elevation device has a substrate including therein a hollow structure, and the battery and the control circuit are accommodated in the substrate.

7. A method performed by an illumination system, comprising:
   changing a length of a reel wire extending downwardly;
   elevating an illumination device connected to the reel wire by changing the length of the reel wire;
   supplying electric power from a power supply through the reel wire to the illumination device;
   storing the electric power supplied through the reel wire in a battery; and
   causing a light-emitting element to emit light using the electric power supplied through the reel wire and the electric power supplied from the battery.

* * * * *